(12) United States Patent
Meinsen (10) Patent No.: US 8,185,831 B2
(45) Date of Patent: May 22, 2012

(54) SYSTEM AND METHOD FOR CREATING IMAGE SCREENS ON A MAINFRAME COMPUTER

(75) Inventor: David Meinsen, Independence, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 654 days.

(21) Appl. No.: 12/195,607

(22) Filed: Aug. 21, 2008

(65) Prior Publication Data

US 2010/0050099 A1    Feb. 25, 2010

(51) Int. Cl.
G06F 13/00    (2006.01)
G06F 15/00    (2006.01)

(52) U.S. Cl. ........................ 715/762; 715/765

(58) Field of Classification Search .......... 715/763–765, 715/741–743, 851–853, 840, 841, 826
See application file for complete search history.

(56) References Cited

U.S. PATENT DOCUMENTS

2004/0111464 A1 *   6/2004   Ho et al. ................... 709/203
2004/0221292 A1 *  11/2004   Chiang et al. ............ 719/310

* cited by examiner

*Primary Examiner* — Cao "Kevin" Nguyen
(74) *Attorney, Agent, or Firm* — Swanson & Bratschun, L.L.C.

(57) ABSTRACT

One embodiment of a system and method for creating a macro statement to create a display screen on a mainframe database system includes, in a mainframe computer, reading an image screen datafile including control cards, parsing each of the control cards, and generating macro statements that define content and attributes of data fields on the image screen defined by the control cards in the image screen datafile.

19 Claims, 4 Drawing Sheets

300

APPLICATION PROCESSOR TABLE UPDATE/INQUIRY ← 302

306
304 → ACTION CODE: _/_ (A=ADD, C=CHANGE, D=DELETE, I=INQUIRE)
APPLICATION ID: ___
PROGRAM NAME: _________
APPLICATION PROCESSOR CODE: _
SLEEP TIME: _________

1--------10--------20--------30--------40--------50--------60--------70--------
                                                                              402
        ATTR  Y
        PFK   Y
        SCS1  Y      } 404
  B     EQU   '(PROT,HI)'
  DB070 START DB070D ← 406
                   PRODUCTION&ORDER&TRANSACTION& ← 408
        BILL TO: _________     SHIP TO: _________
410 → SHIP DATE: ___+MODE: ___ ADDRESS: _________
        CARRIER: _____ 414            _________
        SALESMAN: _____ 412           _________

ITEM QNTY UNIT   ITEM QNTY UNIT   ITEM QNTY UNIT
        ___+ ___+ ___+   ___+ ___+ ___+   ___+ ___+ ___+
        ___+ ___+ ___+   ___+ ___+ ___+   ___+ ___+ ___+
        ___+ ___+ ___+   ___+ ___+ ___+   ___+ ___+ ___+
        ___+ ___+ ___+   ___+ ___+ ___+   ___+ ___+ ___+
                                                    B ← 416
  PF1 = INQUIRY SCREEN, PF2 = CHANGE SCREEN, PF3 = RETURN SCREEN
        END

SYSTEM AND METHOD FOR CREATING IMAGE SCREENS ON A MAINFRAME COMPUTER

BACKGROUND OF THE INVENTION

Mainframe computers are labor intensive programming environments. Mainframe computers run jobs that call procedures or procs to perform certain functions. Each proc may include parameters or parms that operate as variables. Each job typically includes a proc and one or more corresponding control cards.

Image screens, which are typically text-based, user interface screens, operate as user interfaces with application programs. Programming image screens is a labor intensive effort as the software coding used to create the image screens uses a lengthy macro language. Even though certain display software libraries have been created over the years to simplify displaying image screens on different display terminals, programming each customized image screen using lengthy macro language software coding is still time consuming and labor intensive. In addition, programming image screens generally requires a skilled programmer to perform the coding.

Information Management System is a database management system available from International Business Machines (IBM). Message Format Services (MFS) is a library of software modules that are usable by IMS macros to produce image screens. As with other mainframe computer software packages, creating image screens by programming using MFS is still labor intensive and time consuming.

SUMMARY OF THE INVENTION

To overcome the time consuming and labor intensive programming efforts to program image screens on mainframe computers, the principals of the present invention provide for a preprocessor configured to receive an image screen datafile, parse the datafile, and generate macro programming code that is executed to generate an image screen. The image screen datafile may be created by a user to represent both literal images (i.e., text for display) and attribution codes to provide attributes (e.g., bold, non-display, numeric entry, etc.) to the text or text entry fields.

One embodiment of a process for creating a macro statement to create a display screen on a mainframe database system includes, in a mainframe computer, reading an image screen datafile including control cards, parsing each of the control cards, and generating macro statements that define content and attributes of data fields on the image screen defined by the control cards in the image screen datafile.

One embodiment of a system for creating macro statements to create a display screen on a mainframe database system includes a mainframe computer including a processing unit, storage unit, and memory. The processing unit may be configured to execute software, that when executed, causes the processing unit to read an image screen datafile including a plurality of control cards, parse each of the control cards, and generate macro statements that define content and attributes of data fields on the image screen defined by the control cards in the image screen datafile.

Another process for creating image screens on a mainframe computer may include generating an image screen datafile including text and attribute codes. The image screen datafile may be preprocessed to generate a macro datafile. The macro datafile may be stored in a source library. The macro datafile may be compiled and stored in a format library for use by application programs to display image screen with which a user interacts.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
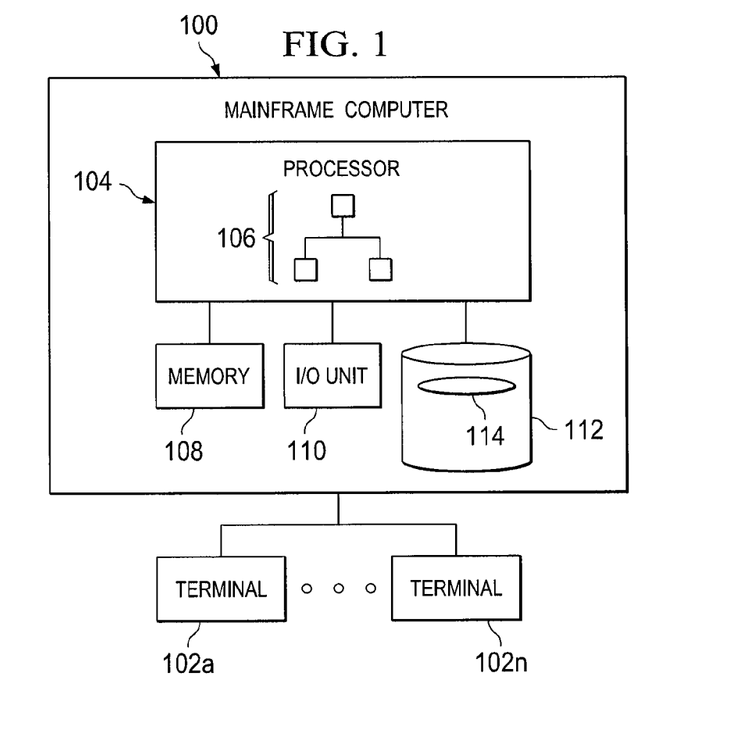
FIG. 1 is a block diagram of an illustrative mainframe computer configured to operate a preprocessor to process an image screen datafile and generate macro code that, when executed by a processor, creates image screens for users of a mainframe database system.

With regard to FIG. 1, a mainframe computer 100 is in communication with terminals 102a-102n (collectively 102) on which users may interface with the mainframe computer 100. The mainframe computer 100 includes a processing unit 104 that executes software 106. As understood in the art, the processing unit 104 may include one or more computer processors to execute the software 106. The processing unit 104 is further in communication with memory 108, input/output (I/O) unit 110, and storage unit 112. The storage unit 112 may store content management system software, such as Information Management System Software available from IBM®. Information Management System is software that operates to maintain databases and includes a communications package, Message Format Service (MFS), to allow programmers to more easily communicate with the databases when writing application software.

The software 106 may include application software, such as an accounting system, that users of the terminals 102 may interface. As understood in the art, the users interface with image screens that are user interactive to allow users to interact with the application software. Such interaction may enable a user to manage and utilize data stored in databases on the mainframe computer 100, for example. In accordance with the principals of the present invention, a preprocessor (not shown), which may be part of the software 106, may be executed by the processing unit 104 to allow programmers to more easily create software code in the form of macro statements to generate image screens with which users may interact to interface with the application software. In one embodiment, the macro statements are Message Format Service (MFS) code that can be compiled and executed by the processing unit 104.

Figure 2:
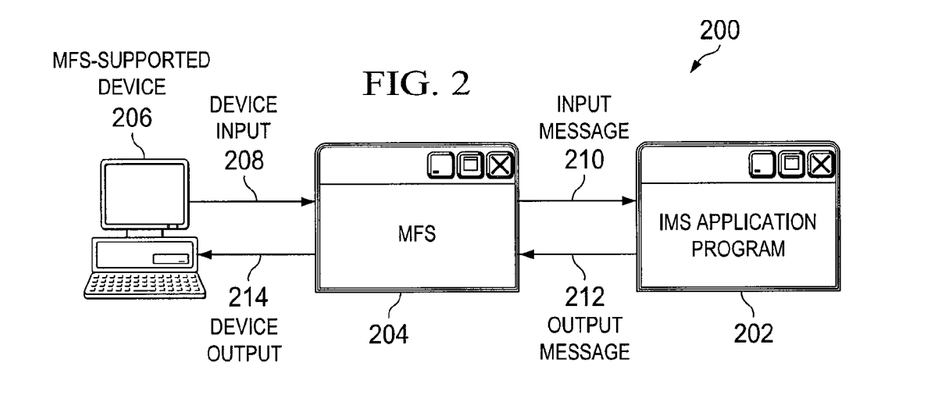
FIG. 2 is a block diagram of an illustrative software structure in which macro code generated by a preprocessor may be utilized.

With regard to FIG. 2, a software environment 200 being executed by a processing unit on a mainframe computer is provided. The software environment includes Information Management System (IMS) application program 202 and Message Format Service 204. Message Format Service is a facility of IMS 202 that formats messages to and from terminal devices, such as display screens and printers. MFS 204 allows application programs of IMS 202 to not have to code specific characteristics for input and output messages, but rather call MFS procs that have been previously coded and stored in a library. In addition, MFS 204 formats messages to and from user-written programs in remote controllers and subsystems so that application programs do not have to be coded deal with transmission-specific characteristics of the remote controller. To simplify IMS application development and maintenance, MFS 204 performs many common application program functions and gives application programs a high-degree of independence from specific devices or remote programs.

An MFS-supported terminal 206 may communicate with MFS 204 via a device input at step 208. At step 210, MFS 204 may communicate an input message at step 210 to IMS 202. At step 212, IMS 202 may communicate an output message to MFS 204. In response, MFS 204 may communicate a device output at step 214 to the MFS-supported device 206. Four types of MFS control blocks, which are sets of software code, may be used to format input and output functionality for the application program 202 and terminal 206. The MFS control blocks include message output descriptor (MOD) block, device output format (DOF) block, device input format (DIF) block, and message input descriptor (MID) block. The message output descriptor block provides for defining layout of messages that MFS 204 receives from the application program 202. The device output format block describes how MFS formats messages for each of the devices that the application program 202 communicates. The device input format block describes the formats of messages MFS 204 receives from each of the devices with which the application program 202 communicates. The message input descriptor block describes how MFS 204 formats messages so that the application program 202 can process them.

Figure 3:
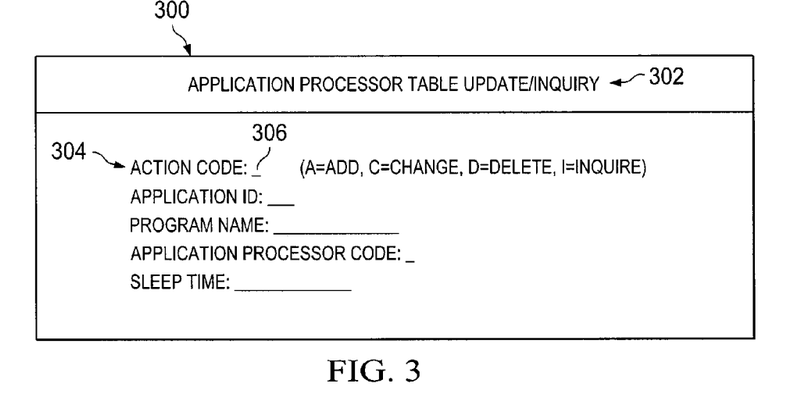
FIG. 3 is a screen shot of an illustrative image screen that may enable a user to interface with an application program.

With regard to FIG. 3, a screen shot of an illustrative image screen 300 is shown. The image screen 300 includes a title 302 and literal text 304. An input field 306 is shown as an underline to allow a user to enter a character input. Traditionally, the image screen 300 has been created by a programmer writing lengthy macro statements, such as macro statements shown in TABLE I below, to create the image screen 300. As previously described, such programming is labor intensive and time consuming. The image screen 300 may be used by a user to interact with an application program, such as a database utility program.

Figure 4:
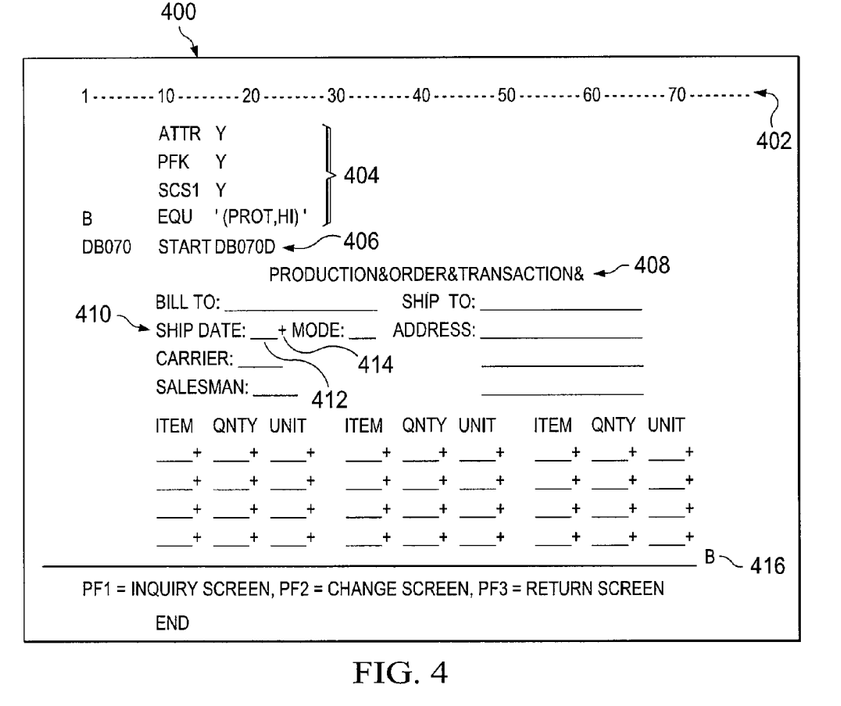
FIG. 4 is a screen shot of an illustrative text editor on which an illustrative screen layout design is displayed.

With regard to FIG. 4, a text editor 400 is shown to include column positions 402 across the top of the editor 400. Each row of text shown in the text editor 400 is a control card. The text editor 400 may be used by a programmer to create an image screen datafile formed of between 3 and 24 control cards that may be processed by a preprocessor to create macro statements that represent or define an image screen as "programmed" by the control cards contained in the editor 400. In one embodiment, a maximum of 24 control cards shown as individual rows within the editor 400 may be used to define an image screen. Because the number of input control cards is relatively small, use of a preprocessor in accordance with the principles of the present invention results in a reduction of coding, disk storage, errors, and maintenance.

Different types of control cards are shown in the editor 400 that define the image screen. Optional control cards 404 may be listed first to control operation of the preprocessor. Each of the control statements contain a keyword in columns 10 through 14. The optional control cards 404 precede a start statement 406, which indicates start of the image screen. The four optional control cards 404 are described below.

EQU Statement

Equate statements may be used to define customized attributes for letters A to Z. The letter is coded in column one, "EQU" are coded in column 10-12, and the attributes are coded in column 16-50. Equate statements are defined once when executing the preprocessor and apply to each image screen. Any of the letters used with the EQU statement can be used as attributes following input fields in the image screen. Letters Q to Z are used for numeric fields that may be used to right justify and zero filled in the message input device block. An example EQU statement is provided below.

B EQU '(NUM,MOD)'

ATTR Statement

If the application program modifies field attributes, the ATTR statement is coded before the START statement. The keyword "ATTR" is coded in columns 10-13 and "Y" in column 16. All formats following the ATTR statement contain attributes in the MID and MOD. An example ATTR statement is provided below.

ATTR Y or N

SCS1 Statement

If the application program outputs to a printer, code an SCS1 statement before the START statement. The keyword "SCS1" is coded in columns 10-13 and "Y" is coded in column 16. All formats following the SCS1 statement contain an additional DOF for DEVICE equals SCS1. An example of the SCS1 statement is provided below.

SCS1 Y or N

PFK Statement

If the application program uses "PF" keys, a PFK statement is coded before the START statement. The keyword "PFK" is coded in columns 10-12 and "Y" is coded in column 16. All formats following the PFK statement contain PFK in the DIF/DOF and PFKIN in the MID and MOD blocks. An example PFK statement is provided below.

PFK Y or N

Required Control Cards

Each screen image is preceded by a "START" control card to establish the format name and the DIF/DOF name. The format name is coded in columns 1-5, the keyword "START" is coded in columns 10-14 and the DIF/DOF name is coded in columns 16-21. The preprocessor takes the format name supplied on the start card and "M01" is added as the last characters in the MOD name and "N01" in the MID name. Using the example "START" control card below, the MOD name is DB070M01, the MID name is DB070N01, and the DIF/DOF name is DB070D.

DB070 START DB070D

Image Screen

The control cards after the "START" statement represent the screen layout. There may be between 3 and 24 control cards including "START" and "END" control cards. Each of the screen image control cards may include literal text and attribute codes to represent text and attributes of the text and text entry fields. For the purpose of this description, content refers to the information, such as literal text, contained in an image screen datafile that is to be displayed on an image screen.

End Statement

The last card of the screen image is an "END" control card to indicate the end of the screen image. The keyword "END" is coded in columns 10-12.

END

Coding a Screen

The first step in the creation of an image screen is its layout on a standard IBM card form coding sheet (e.g., text editor of FIG. 4). Screen fields are written on the coding sheet in the way they are to appear on the image screen on which a user is to interface. Data fields may be indicated by underscores (i.e., "_"). Each underscore represents one byte of a text entry field. Any other non-blank character is considered to be a protected literal in the DIF/DOF.

There are two major types of fields: protected and unprotected. Protected fields are areas on an image screen where no data may be entered. For example, a protected field may be an area that program error messages may be displayed. Unprotected fields are areas on an image screen where data is to be entered, such as a text entry field.

A field also has attributes, which inform the system as to field type. A field can have a numeric attribute, which means that the keyboard locks if entry of an alphabetic character is attempted to be entered. An unprotected field with an alphanumeric attribute permits any character to be entered. An input/output field can also have a non-display attribute, which means text entered into the field is never displayed on the screen.

An example of literal field and input field is shown below. The literal is in the form of "ADDRESS:" followed by a 30-byte input field formed by a series of underlines with an attribute character, minus sign ("−"), following the underlines. Since the attribute character is a minus sign ("−"), the input field is assigned the attributes of UNPROT,MOD in the DIF/DOF block. The attributes of this field could be changed to UNPROT,MOD,HI by ending the field with a blank.

ADDRESS:______________________−

An attribute character follows each input/output field to define that field's attributes. The attribute character is called an attribute byte. On the coding sheet or text editor, each attribute byte appears after the input/output field in a box. The following list provides different characters that can be used to define attributes of an input/output field.

| | | |
|---|---|---|
| PROTECTED ALPHA PREMODIFIED | > | greater than |
| PROTECTED ALPHA HIGH | * | asterisk |
| PROTECTED ALPHA PREMODIFIED HIGH | @ | at-sign |
| PROTECTED ALPHA PREMODIFIED NODISPLAY | ; | semi-colon |
| PROTECTED NUMERIC NORMAL | = | equal |
| PROTECTED NUMERIC HIGH | $ | dollar sign |
| PROTECTED NUMERIC NONDISPLAY | : | colon |
| UNPROTECTED ALPHA NORMAL | < | less than |
| UNPROTECTED ALPHA NONDISPLAY | % | percent |
| UNPROTECTED ALPHA HIGH | ( | left parentheses |
| UNPROTECTED ALPHA PREMODIFIED | − | minus |
| UNPROTECTED ALPHA PREMODIFIED HIGH | | blank |
| UNPROTECTED NUMERIC NORMAL | ! | exclamation |
| UNPROTECTED NUMERIC NONDISPLAY | # | pound |
| UNPROTECTED NUMERIC HIGH | / | slash |
| UNPROTECTED NUMERIC PREMODIFIED | ? | question |
| UNPROTECTED NUMERIC PREMOD NODISPLAY | ) | right parentheses |
| UNPROTECTED NUMERIC PREMOD HIGH | & | ampersand |
| *UNPROTECTED NUMERIC PREMOD HIGH | + | plus |
| *UNPROTECTED NUMERIC PREMOD | . | period |
| DEFINED BY USER WITH EQU STATEMENT | A-P | |
| *DEFINED BY USER WITH EQU STATEMENT | Q-Z | |

*zero filled, right justified in MID

The programmer or image screen designer codes the image screen the way he or she wants the image screen to appear on an electronic display. Input/output fields are represented with an underscore for each byte on the field. Attributes are indicated by the next byte following the last byte of the input/output data field. For example, a 10-byte numeric pre-modified field would be represented by 10 underscores and a "?".

To highlight a literal field, an ampersand ("&") may be coded after the literal field. The ampersand is treated as a space for display purposes. As shown in FIG. 4, the title will be highlighted when displayed because each of the literal fields end with an ampersand.

After the START statement, the screen is coded as it is to appear. Input fields can be coded vertically, such as the BILL TO input field, or horizontally, such as the ITEM input field. Fields in the MID and MOD will be in the order as configured on the image screen datafile—from left to right and top to bottom.

If attributes A-Z are used and the EQU statement is not included for the letter used, no attribute is applied to the field, so the default will be assigned. EQU statements are coded once in the input.

If the optional control card PFK is set to "Y," an additional field PFKIN length 1 will be placed in the MID and MOD after the SIGNON field. The PFKIN field will contain 1-C, thereby indicating which PF key was pressed, where 1-9=PF1-9, A=PF10, B=PF11 and C=PF12. The program checks the PFKIN field to determine if a PF key was pressed.

If the ATTR option is Y, an additional MFLD LTH=02 will be included in the MID block before each field and 2 bytes will be added to the length of each field in the MOD with ATTR=YES. The program should include the two bytes before each field for the attribute bytes in the I/O areas.

If more than one screen image is in the input image field, each START can be preceded with the optional control cards to turn those options off and on for each image screen. The default for the optional control cards is N.

The following is a list of illustrative rules and suggestions to be followed when coding an image screen:

1. An unprotected field or a literal may be a maximum of 79 positions.

2. An ampersand (&) or a quotation mark (') cannot be used (FS language restriction).

3. Each screen has a unique name of five characters. "M01" will be added to the MOD name and "N01" will be added to the MID name.

4. Characters START, PFK, EQU, SCS1 and END may not be used in columns 10-15 in the screen image.

5. Line 1 positions 2-9 are reserved for Transaction code (MOD,PROT). Line 2 positions 2-26 are reserved for Signon information (NODISP).

6. Lines 1 and 2 positions 73-80 are reserved for the date and time and should not be used.

7. Each screen image is to be preceded by a START control card.

8. The last card of each screen image is to be an END control card.

9. At least one blank (or ampersand) is to be positioned between a literal and an input field.

10. The last MFLD is used for SYSMSG, so that field is generally a message field.

11. The ATTR control card is not required and may be omitted. The default is N.

12. The SCS1 control card is not required and may be omitted. The default is N.

13. Use blank cards to skip unused lines on the screen image.

14. End literals with an ampersand (&) to cause them to be highlighted. The ampersand is treated as a space when displayed on an image screen.

15. The EQU control cards are not required unless letters A-Z are used as attributes on the screen image. If attributes A-Z are used, do not code the EQU or use an invalid character, no ATTR will be placed on the field and it will default to UNPROT. Code EQU statements once in the input before any START statements. EQU applies to all screens in the input.

16. One to twenty-four screen image cards may be used. The lines following the END card will be blank.

17. The attribute character is last character of a data field.

18. Attribute characters except for "&" may be used in literals.

TABLE I shows an illustrative macro code output of a preprocessor that has read an image screen datafile, parsed the datafile, and generated macro code representative of the literals and attributes contained in the image screen datafile. As shown, a MID block, MOD block, and DIF/DOF block is included in the image screen datafile.

TABLE I

```
                    PRINT NOGEN
*       PREPROCESSOR (C) 2007 BY EMBARQ CORP
*       MESSAGE INPUT DESCRIPTION (MID)
DB090N01        MSG     TYPE=INPUT,SOR=DB090D,NXT=DB090M01
                SEG
                MFLD    TRAN,LTH=09
                MFLD    SIGNON,LTH=25
*                       DB2 APPLICATION PROC TABLE UPDATE/
                        INQUIRY
*       ACTION CODE: __     (A=ADD, C=CHANGE, D=DELETE, I=INQUIRE)
                MFLD    A001,LTH=02,FILL=X'00'
                MFLD    F001,LTH=01
*       APPL ID: ____
                MFLD    A002,LTH=02,FILL=X'00'
                MFLD    F002,LTH=02
*       PROGRAM NAME: ________
                MFLD    A003,LTH=02,FILL=X'00'
                MFLD    F003,LTH=08
*       APPLICATION PROC CODE: __
                MFLD    A004,LTH=02,FILL=X'00'
                MFLD    F004,LTH=01
*       SLEEP TIME: ________ +
                MFLD    A005,LTH=02,FILL=X'00'
                MFLD    F005,LTH=08,JUST=R,FILL=C'0'
* ______________________________________________________ @
                MFLD    A006,LTH=02,FILL=X'00'
                MFLD    F006,LTH=70
                MSGEND
*       MESSAGE OUTPUT DESCRIPTION (MOD)
DB090M01        MSG     TYPE=OUTPUT,SOR=(DB090D,IGNORE),
                        NXT=DB090N01,FILL=PT
                SEG
                MFLD    TRAN,LTH=09
                MFLD    SIGNON,LTH=25
*                       DB2 APPLICATION PROC TABLE UPDATE/
                        INQUIRY
*       ACTION CODE: __     (A=ADD, C=CHANGE, D=DELETE, I=INQUIRE)
                MFLD    F001,LTH=03,ATTR=YES
*       APPL ID: ____
                MFLD    F002,LTH=04,ATTR=YES
*       PROGRAM NAME: ________
                MFLD    F003,LTH=10,ATTR=YES
*       APPLICATION PROC CODE: __
                MFLD    F004,LTH=03,ATTR=YES
*       SLEEP TIME: ________ +
                MFLD    F005,LTH=10,ATTR=YES
* ______________________________________________________ @
                MFLD    F006,LTH=72,ATTR=YES
                MFLD    (S001,DATE4)
                MFLD    (S002,TIME)
                MSGEND
*       DEVICE INPUT/OUTPUT FORMAT (DIF/DOF)
DB090D          FMT
                DEV     TYPE=(3270,2),FEAT=IGNORE,                X
                        SYSMSG=F006
                DIV     TYPE=INOUT
                DPAGE   CURSOR=((04,19))
TRAN            DFLD    POS=(1,2),LTH=9,ATTR=(MOD,PROT)
SIGNON          DFLD    POS=(2,2),LTH=25,ATTR=(MOD,PROT,NODISP)
S001            DFLD    POS=(1,72),LTH=8,ATTR=PROT
S002            DFLD    POS=(2,72),LTH=8,ATTR=PROT
                DFLD    'DB2',POS=(01,19)
                DFLD    'APPLICATION',POS=(01,23)
```

TABLE I-continued

|      | DFLD | 'PROC',POS=(01,35) |
|------|------|---------------------|
|      | DFLD | 'TABLE',POS=(01,40) |
|      | DFLD | 'UPDATE/INQUIRY',POS=(01,46) |
|      | DFLD | 'ACTION',POS=(04,06) |
|      | DFLD | 'CODE:',POS=(04,13) |
| F001 | DFLD | POS=(04,19),LTH=01,ATTR=(MOD,HI) |
|      | DFLD | '(A=ADD,',POS=(04,23) |
|      | DFLD | 'C=CHANGE,',POS=(04,31) |
|      | DFLD | 'D=DELETE,',POS=(04,41) |
|      | DFLD | 'I=INQUIRE)',POS=(04,51) |
|      | DFLD | 'APPL',POS=(06,06) |
|      | DFLD | 'ID:',POS=(06,11) |
| F002 | DFLD | POS=(06,15),LTH=02,ATTR=(MOD,HI) |
|      | DFLD | 'PROGRAM',POS=(08,06) |
|      | DFLD | 'NAME:',POS=(08,14) |
| F003 | DFLD | POS=(08,20),LTH=08,ATTR=(MOD,HI) |
|      | DFLD | 'APPLICATION',POS=(10,06) |
|      | DFLD | 'PROC',POS=(10,18) |
|      | DFLD | 'CODE:',POS=(10,23) |
| F004 | DFLD | POS=(10,29),LTH=01,ATTR=(MOD,HI) |
|      | DFLD | 'SLEEP',POS=(12,06) |
|      | DFLD | 'TIME:',POS=(12,12) |
| F005 | DFLD | POS=(12,18),LTH=08,ATTR=(NUM,MOD,HI) |
| F006 | DFLD | POS=(14,02),LTH=70,ATTR=(PROT,MOD,HI) |
|      | FMTEND |  |
|      | END |  |

The below sample job will generate MFS code and put the member DB090M01 in DBA.SOURCE library unless SOURCE='your PDS' is specified on the MFSGEN$ proc.
Sample Job

```
//CDK0976C1 JOB (7019,TEST),DSTS.DBA,MSGCLASS=R,CLASS=A
/*JOBPARM        ROOM=DBAC
/*NOTIFY         JES25.CDK0976
/*ROUTE   PRINT  JES25
/*XEQ     JES25
//JS010    EXEC MFSGEN$
//CARDIN   DD *
DB090      START  DB090D
                  DB2&APPLICATION&PROC&TABLE&UPDATE/INQUIRY&
    ACTION CODE: __    (A=ADD, C=CHANGE, D=DELETE, I=INQUIRE)
    APPL ID: ____
    PROGRAM NAME: ________
    APPLICATION PROC CODE: __
    SLEEP TIME: _______ +
_______________________________________________@
           END
```

Figure 5:
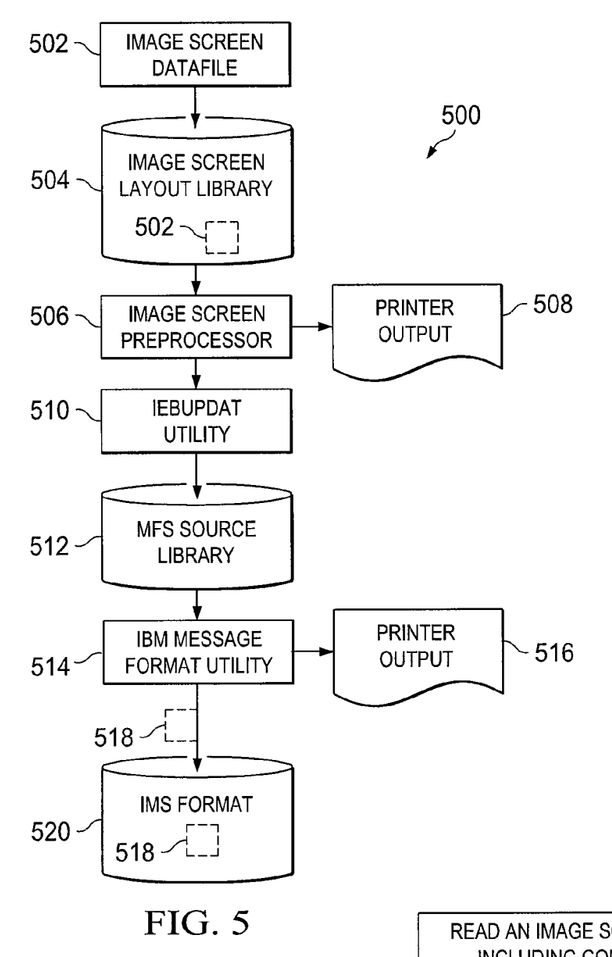
FIG. 5 is a flow chart of an illustrative process for producing software from an image screen datafile that, when executed, creates an image screen as designed by a screen layout design on a text editor.

With regard to FIG. 5, a process 500 for generating and utilizing image screen software code produced by an image screen preprocessor is provided. An image screen data file 502, such as the image screen data file of FIG. 4, may be added to an image screen layout library 504. The image screen layout library 504 may be a data repository of various image screen layouts available for a user to utilize when developing user interfaces for different software applications. The image screen data files stored in the image screen layout library 504 are generally a collection of text files that include control cards including literals, fields, and attributes, as previously described.

An image screen preprocessor 506 may be configured to read one or more image screen data files and generate software, such as macro statements, that represent the information contained in each of the image screen data files. The image screen preprocessor 506 may generate a printer output 508 that the image screen preprocessor 506 produces in response to processing the image screen data file 502. An IEBUPDAT utility 510, which is available in MFS (see, FIG. 2), may be utilized to create or modify sequential or partitioned data sets. The IEBUPDAT utility 510 may be used for updating an MFS source library 512. The MFS source library 512 may be updated to store source code produced by the image screen preprocessor 506 for each image screen data file.

An IBM message format utility 514 may be utilized in generating IBM message format machine code datafiles for use in generating the image screens defined by the image screen datafiles created by users. As shown, the IBM message format utility 514 may generate a printer output 516 that displays the image screen associated with a datafile that is being compiled by the IBM message format utility 514. Furthermore, the IBM message format utility 514 may generate a machine language datafile 518 that may be stored in an IMS.FORMAT data repository 520. Thereafter, the machine language datafile 518 may be executed by an application program to enable a user to interface with the application program.

Figure 6:
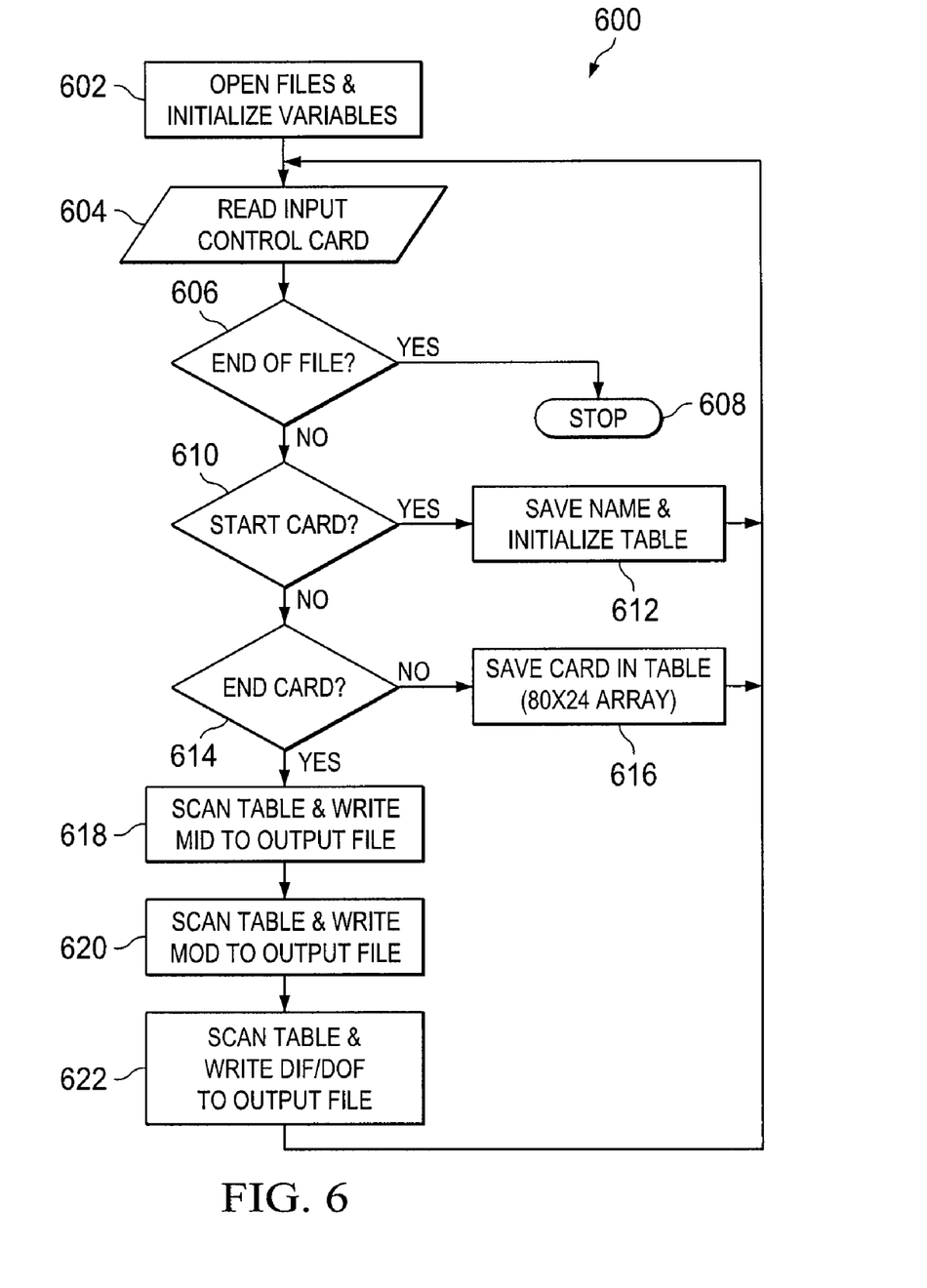
FIG. 6 is a flow diagram of an exemplary process of a preprocessor configured to create macro code from an image screen datafile.

With regard to FIG. 6, an illustrative process 600 that describes the operation of the preprocessor 506 (FIG. 5) is shown. At step 602, the preprocessor opens image datafile and initializes variables. At step 604, the preprocessor reads an input control card in the image screen datafile. The input control card is a maximum 80 byte string that includes literal and attribute characters that define operation of the image screen. At step 606, the image screen datafile is parsed by reading each character or string of characters along a control card and making a determination as to whether the preprocessor is at the end of the image screen datafile. If so, then the process 600 stops at step 608. If not at the end of the datafile, the process 600 continues parsing the datafile at step 610, where a determination is made as to whether the preprocessor is at the start of a control card. If so, the process 600 continues at 612, where a name is saved and a table for the image screen is initialized. The process thereafter returns to 604. If the determination is made that the preprocessor is not at the start of a control card at step 610, then the process 600 continues at step 614, where a determination is made as to whether the preprocessor is at the end of the control card at step 614. If not at the end of the control card, then the process 600 continues at step 616, where the control card is saved in a table defined as an 80×24 array. The process thereafter continues at step 604.

If the preprocessor is determined to be at the end of the control card at step 614, then the process 600 continues at step 618 where the preprocessor scans a table, which may be an array of 24 lines by 80 characters each, containing the image screen datafile, and writes a message input descriptor (MID) block to an output file. At step 620, the preprocessor scans the table and writes a message output descriptor (MOD) block to an output file. At step 622, the preprocessor scans the table and writes device input format and device output format blocks to the output file. The process 600 continues at step 604.

Diagnostic messages that are generated during preprocessing the image screen datafile may be printed on the printer output at the right side of the page. If any errors are encountered, the image screen is not generated. Errors should be corrected and the job should be rerun to create the image screen. The following is an illustrative list of the possible error messages:

---
START CARD MISSING
LINE 1 COLS 2-9 RESERVED
LINE 1 COLS 72-80 RESERVED
LINE 2 COLS 2-26 RESERVED
LINE 2 COLS 72-80 RESERVED
TOO MANY EQU CARDS
MID/MOD NAME INVALID
DIF/DOF NAME INVALID
FORMAT EXCEEDS 24 LINES
END CARD MISSING

---

Figure 7:
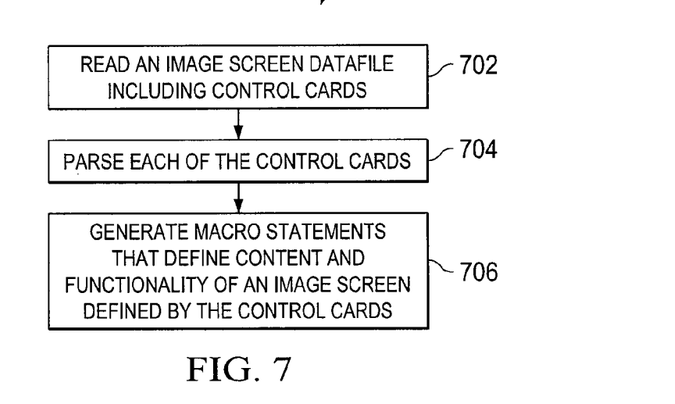
FIG. 7 is a flow diagram of an illustrative process for a preprocessor to generate macro code from an image screen datafile.

With regard to FIG. 7, an illustrative process 700 for reading an input screen datafile and generating macro statements that define the image screen is provided. At step 702, an image screen datafile including multiple control cards is read. In reading the image screen data file, each tow of the datafile is a control card. At step 704, the process 700 parses each of the control cards. In parsing each of the control cards, each character or groups of characters may be read to determine whether the control card is an optional control card or requited control card. In addition, in parsing each of the control cards, an identifier indicating that the start of the image for display in an image screen may be identified. Image screen control cards that include literals, fields, and attributes may be identified while parsing. At step 706, macro statements that define content and functionality, such as attributes of data fields, of an image screen defined by the control cards may be generated. In generating the macro statements, the macro statements may include blocks of macro statements for use in a particular content management system, including IMS.

In summary, the preprocessor provides macro statement input for the IMS Message Format Language Utility. The preprocessor aids in screen design since the preprocessor produces printed output of the screen image with the field attribute characters as entered. A screen designer can quickly verify that the layout and attributes are correct. The preprocessor improves throughput since the preprocessor can be used without the IMS Message format Language Utility to ensure an error free screen, which means that with the preprocessor, the time from conception of a screen design to its availability to the IMS application can be greatly reduced.

Furthermore, the preprocessor reduces disk storage space; without the preprocessor, storage requirements for the source statements for a screen, including all message input/output descriptors and device input/output format, is on the order of 200 to 1000 card images. The only source backup that the preprocessor needs is the screen image plus the control statements. The preprocessor further reduces keying errors as well as coding errors since the number of cards is reduced. It is not necessary to depend on the ability of a macro writer to interpret the work of an image screen designer. Anyone can design a screen without knowledge of the Message Format Service macro language; syntactical errors are eliminated because the macro statements are generated by the preprocessor.

The preprocessor makes ease of maintenance easier since changes that affect the size of a field normally affect the location of succeeding fields on the same line. With the preprocessor, the maximum number of screen image cards to change is 24 and that allows any number of changes per line. If the screen to be modified requites an update to the macro statement output, a corresponding update is made after modification. The preprocessor further improves use of machine resources. The IMS Message Format Language Utility is a four-phase program, which uses IEBCOPY to compress and the linkage editor to update datasets. Processing is completed before errors regarding the fields on the screen are detected. However, if the preprocessor is used to produce error free output, error free execution of the utility is more likely.

The previous detailed description is of a small number of embodiments for implementing the invention and is not intended to be limiting in scope. One of skills in this art will immediately envisage the methods and variations used to implement this invention in other areas than those described in detail. The following claims set forth a number of the embodiments of the invention disclosed with greater particularity.

What is claimed:

1. A method for creating a macro statement to create a display screen on a mainframe database system, said method comprising:

in a mainframe computer:

reading an image screen datafile including a plurality of control cards, wherein the plurality of control cards comprises one or more optional control cards selected from a group of optional control cards consisting of an EQU STATEMENT used to define customized attributes for letters A to Z, an ATTR STATEMENT used to modify field attributes, an SCS1 STATEMENT used to call for output to a printer and a PFK STATEMENT used to provide for application program use of PF keys, and wherein the plurality of control cards further comprises three or more required control cards selected from a group of required control cards consisting of a START control card to establish a format name and a DIF/DOF name, an IMAGE SCREEN control card used to represent the screen layout and further comprising text and attribute codes, and an END control card used to indicate the end of the screen image;

parsing each of the control cards; and generating macro statements that define content and attributes of data fields on the image screen defined by the control cards in the image screen datafile.

2. The method according to claim 1, wherein reading the image screen datafile includes reading between 3 and 24 control cards.

3. The method according to claim 1, wherein parsing each of the control cards includes determining whether each of the control cards is optional or required.

4. The method according to claim 1, wherein parsing each of the control cards includes inspecting each character along a control card and determining whether each character represents a literal or attribute code.

5. The method according to claim 4, wherein parsing each of the control cards further includes determining attributes of literals or data fields.

6. The method according to claim 1, wherein generating macro statements includes generating macro statements of Message Format Services for Information Management System.

7. The method according to claim 1, wherein macro statements includes generating at least one of message output format descriptive block, message input descriptive block, device output descriptive block, and device input descriptor block.

8. The method according to claim 1, wherein generating macro statements includes generating macro statements to print a screen image on a printer representative of the screen image defined by the control cards.

9. The method according to claim 1 further comprising:
storing the macro datafile in a source library;
compiling the macro datafile; and
storing the compiled macro datafile in a format library for use by application programs to display image screen with which a user interacts.

10. The method according to claim 9, further comprising printing a sample of the image screen.

11. The method according to claim 9, further comprising generating error statements based on the IMAGE SCREEN text and attribute codes.

12. A system for creating macro statements to create a display screen on a mainframe database system, such system comprising:

a mainframe computer including a processing unit, storage unit, and memory, the processing unit configured to execute software, that when executed, causes the processing unit to:

read an image screen datafile including a plurality of control cards, wherein the plurality of control cards comprises one or more optional control cards selected from a group of optional control cards consisting of an EQU STATEMENT used to define customized attributes for letters A to Z, an ATTR STATEMENT used to modify field attributes, an SCS1 STATEMENT used to call for output to a printer and a PFK STATEMENT used to provide for application program use of PF keys, and wherein the plurality of control cards further comprises three or more required control cards selected from a group of required control cards consisting of a START control card to establish a format name and a DIF/DOF name, an IMAGE SCREEN control card used to represent the screen layout and further comprising text and attribute codes, and an END control card used to indicate the end of the screen image;

parse each of the control cards; and generate macro statements that define content and attributes of data fields on the image screen defined by the control cards in the image screen datafile.

13. A system according to claim 12, wherein the datafile includes between three and 24 control cards.

14. The system according to claim 12, wherein said processing unit is further configured to determine whether each of the control cards is optional or required.

15. The system according to claim 12, wherein said processing unit is further configured to inspect each character along the control card to determine whether each character represents a literal or variable.

16. The system according to claim 15, wherein said processing unit is further configured to determine attributes of literals and data fields.

17. The system according to claim 12, wherein the macro statements are macro statements of Message Format Services for Information Management Systems.

18. The system according to claim 12, wherein the macro statements are blocks of at least one of message output format descriptor block, message input descriptor block, device output descriptor block, and device input descriptor block.

19. The system according to claim 12, wherein the macro statements include macro statements configured to print a screen image on a printer representative of the screen image defined by the control cards.

* * * * *